UNITED STATES PATENT OFFICE.

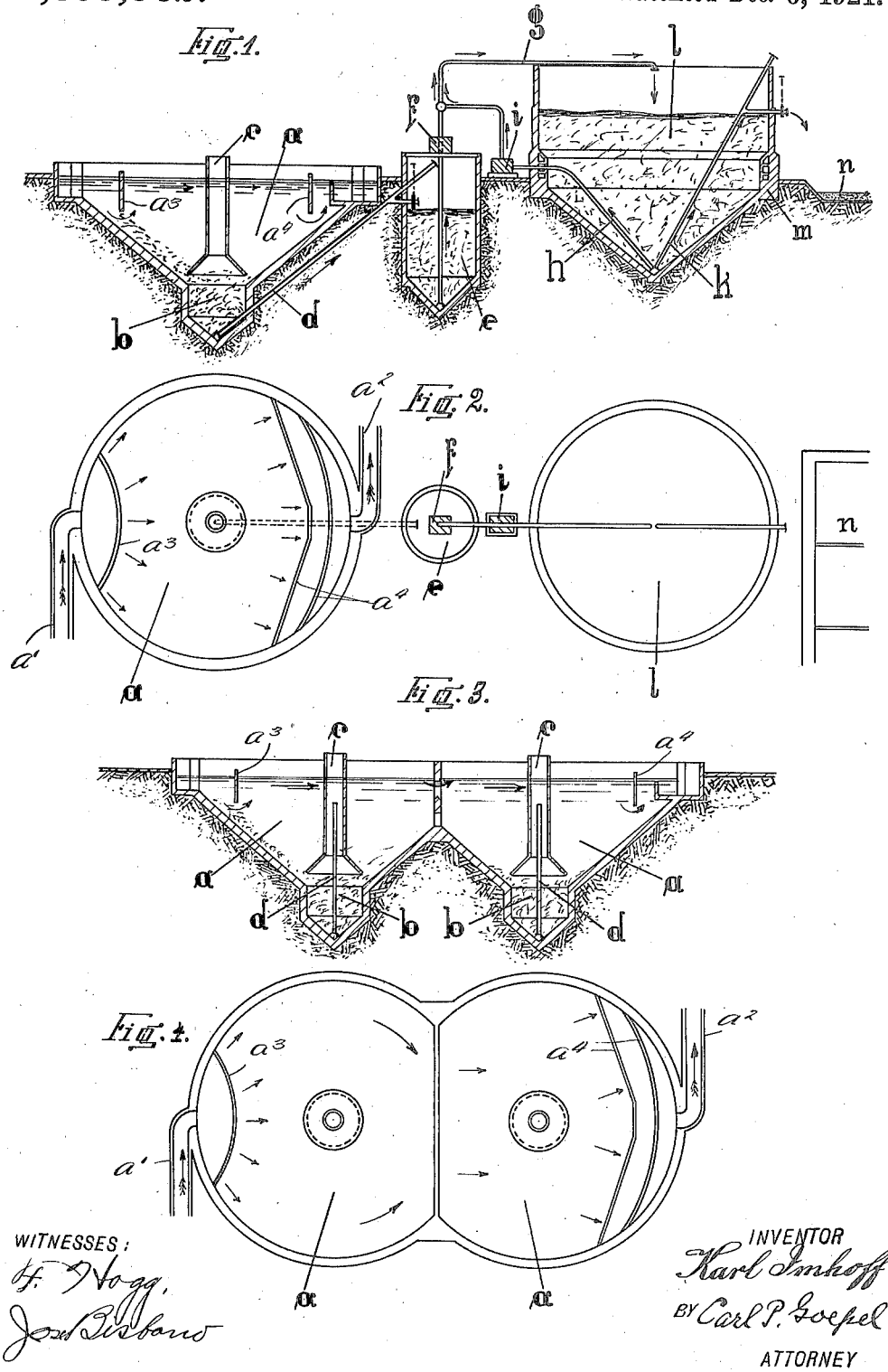

KARL IMHOFF, OF ESSEN-ON-THE-RUHR, GERMANY.

SETTLING-TANK FOR SEWAGE CLARIFICATION.

1,399,562. Specification of Letters Patent. Patented Dec. 6, 1921.

Application filed January 27, 1915. Serial No. 4,661.

(GRANTED UNDER THE PROVISIONS OF THE ACT OF MARCH 3, 1921, 41 STAT. L., 1313.)

*To all whom it may concern:*

Be it known that I, KARL IMHOFF, of Essen-on-the-Ruhr, Germany, engineer, have invented certain new and useful Improvements in Settling-Tanks for Sewage Clarification, (for which I have filed application in Germany, Aug. 10, 1914,) of which the following is a specification.

My invention refers to mechanical sewage clarification and more especially to settling tanks designed to allow the sludge contained in the water to settle so as to free the water from impurities. Now, in order to keep the clarified water constantly fresh, the sludge must be removed in short intervals from the clarification tank. In some plants of this kind the sludge is removed automatically from the settling tank and the water kept clean. These tanks, however, must be comparatively deep and in accordance therewith the brick-work must reach far down into the ground. It has been proposed, therefore, to provide a separate tank for the decomposition of the sludge. There arose, however, the difficulty that it proved impossible to remove the fresh sludge coming in so completely under water as to avoid decomposition in the settling tank.

The present invention contemplates the combination of different systems in one plant to the effect that their advantages be united and their individual drawbacks avoided.

The plant shown in the affixed drawings is the embodiment of my invention at present preferred by me.

Figure 1 is a vertical section, and

Fig. 2 a plan of the whole plant, while

Fig. 3 is a vertical section, and

Fig. 4 a plan of a duplex settling tank to be used in such a plant.

Referring to the drawings, $a$ is a funnel-shaped settling-tank, $b$ is a sludge-pit at the bottom of said tank. Above the pit $b$ is arranged a hood $c$ extending above the water level and open at the top. The sewage or impure water is admitted at $a^1$, at one side of the periphery of the tank, and flows across the tank in a mainly horizontal direction to the outlet $a^2$, being deflected but slightly from such horizontal path by passing under two transverse baffles $a^3$, $a^4$ located adjacent to the inlet and to the outlet respectively. The inlet and outlet are at diametrically opposite points of the periphery of the tank. The sludge separating from the water glides down on the inclined surface of the tank and collects in the pit $b$. By means of a sludge-tube $d$ the sludge is tapped off periodically into the well $e$ and pressed by a pump $f$ through tubing $g$ into the decomposition tank $l$.

In order to hasten the decomposition putrid sludge from the bottom of tank $l$ may be hauled through tube $h$ and be pressed by means of the pump $i$ into the tubing $g$ in order to mix it there with fresh sludge. The decomposition tank $l$ may further be heated by well-known means which in itself forms no part of my invention, thus serving to accelerate the decomposition. After the sludge is decomposed sufficiently, it is carried through tubing $k$ to the drying ground $n$, where a few days' drying brings it into a condition where it can be handled with shovels.

This combination allows the sewage to be clarified to be kept constantly fresh and the sludge is decomposed within the shortest possible time to such a degree as to allow its being dried on the drying ground without molestation.

An important feature of the settling tank described is its circular section and inclined walls. In general rectangular settling tanks have been used necessitating very strong and thick side-walls and creating some difficulty regarding the convenient removal of the fresh sludge. Conical tanks of circular section require the least amount of brick-work and the lowest expenses for their erection; on the other hand, they have the greatest utilizable section. Another important feature is the overflow for the clarified sewage which should not be too long; it is very difficult to make and preserve a fully horizontal cylindrical overflow. A uniform inclination of the side-wall is of importance for an appropriate gliding down of the sludge, and this uniformity of inclination is best obtained in a tank of circular section.

Within a certain limit of speed the clarification of the water is solely dependent upon the time allowed for the clarification.

Now, in order to utilize a certain space as economically as possible, a certain distance of travel is required. Therefore, according to the present invention, contrary to the usual practice, the sewage is not introduced at the center of the tank and tapped off at its periphery, but it flows in at a certain point of the periphery and leaves it at the opposite end of the periphery after having passed a horizontal overflow. It has been observed in practice that a horizontal or mainly horizontal flow of the water lends itself better to clarification than the vertical one. If in the vertical flow the traveling speed of the water is exceeded by a few millimeters, there is danger that the particles of sludge which have already started a downward movement, will again be pulled upward with the ascending stream of sewage and thereby be carried beyond the overflow. If the water is moving horizontally or mainly so, this cannot happen; in the lower part of the settling tank an undisturbed zone is formed where there is no movement of the water. If the particles of sludge in separating from the horizontally moving sewage have once reached this undisturbed zone, there is no chance of their being carried away again, even if the water should acquire a greater speed.

The removal of the sludge from the settling tank is effected by the inclination of the tank bottom. The sludge-pit arranged below the settling tank is designed to receive the fresh sludge coming in, but in removing this fresh sludge again it is not so very important to remove it completely, the hood provided above the pit and extending beyond the water level serving to provide for such an emergency. In the case that particles of sludge left within the sludge-pit should have begun to decompose, their specific weight would be diminished and they would have a tendency to ascend. The hood $c$ will in such a case conduct these particles to the surface of the water where they will give off their gases and sink to the bottom again in order to be removed in the next operation. In no case can any ascending particles of sludge get into the settling tank $a$, and therefore the clarified water is sure to remain fresh.

I claim:

1. In a sewage clarification plant, in combination, a funnel-shaped settling tank, a sludge-pit arranged below the lowest point of said tank, an inlet and outlet at opposite points of the periphery of said tank and a hood arranged within said settling tank above the sludge-pit, said hood extending beyond the water level.

2. In a sewage clarification plant, a downwardly-contracted settling tank, a sludge-pit at the bottom of said tank, and a tube having an open lower end above said pit, to catch material rising therefrom, said tube extending upwardly beyond the water level in the tank.

3. In a sewage clarification plant, in combination, a funnel-shaped settling tank, a sludge-pit arranged at the bottom of said tank, an inlet and outlet at opposite points of the periphery of said tank, a well, a decomposition tank, a pipe leading from the bottom of said sludge-pit through the wall thereof to said well, and a pipe between said well and said decomposition tank.

4. In a sewage clarification plant, a downwardly-contracted settling tank, a sludge-pit at the bottom of said tank, and a tube having an open lower end above said pit, to catch material rising therefrom, said tube extending upwardly beyond the water level in the tank, and having its upper end open to the surrounding air, for the escape of gases.

5. In a sewage clarification plant, a settling tank, a sludge-pit to catch the material settling at the bottom of said tank, a well, a decomposition tank, a pipe leading from the lower part of the sludge-pit to said well, and a pipe connecting said well with said decomposition tank.

In testimony, that I claim the foregoing as my invention, I have signed my name in presence of two subscribing witnesses.

KARL IMHOFF.

Witnesses:
ALBERT VEEFER,
CLARICE EAGER.